(12) United States Patent
Phadke et al.

(10) Patent No.: US 10,257,022 B2
(45) Date of Patent: *Apr. 9, 2019

(54) DETERMINING STATUSES OF COMPUTER MODULES

(71) Applicant: BMC Software, Inc., Houston, TX (US)

(72) Inventors: Nilesh Phadke, Pune (IN); Pallavi Phadke, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,156

(22) Filed: Sep. 12, 2018

(65) Prior Publication Data

US 2019/0013998 A1    Jan. 10, 2019

Related U.S. Application Data

(63) Continuation of application No. 14/750,549, filed on Jun. 25, 2015, now Pat. No. 10,079,713.

(51) Int. Cl.
*G06F 9/50* (2006.01)
*G06F 11/00* (2006.01)
(Continued)

(52) U.S. Cl.
CPC ............ *H04L 41/0663* (2013.01); *G06F 9/50* (2013.01); *G06F 11/008* (2013.01); *G06F 11/34* (2013.01);
(Continued)

(58) Field of Classification Search
None
See application file for complete search history.

(56) References Cited

U.S. PATENT DOCUMENTS

2006/0080738 A1* 4/2006 Bezilla ................. G06F 11/008
726/25
2009/0177927 A1* 7/2009 Bailey .................. G06F 11/008
714/37
(Continued)

OTHER PUBLICATIONS

Extended European Search Report for European Application 16175785.1, dated Oct. 20, 2016, 8 pages.
(Continued)

*Primary Examiner* — Philip J Chea
*Assistant Examiner* — Hassan A Khan
(74) *Attorney, Agent, or Firm* — Brake Hughes Bellermann LLP

(57) ABSTRACT

A non-transitory computer-readable storage medium may include instructions stored thereon for ranking multiple computer modules to reduce failure impacts. When executed by at least one processor, the instructions may be configured to cause a computing system implementing the multiple computer modules to at least associate the multiple computer modules with multiple services that rely on the multiple computer modules, at least one of the multiple services relying on more than one of the multiple computer modules, determine values of the multiple services, and rank the multiple computer modules based on the determined values of the multiple services with which the respective multiple computer modules are associated.

27 Claims, 7 Drawing Sheets

| Computer Module | Score | Rank |
|---|---|---|
| Database 310 | 300 | 1 |
| Server 322 | 200 | 2 |
| Web Server 304 | 150 | 3 |
| HR Application 320 | 125 | 4 |
| Machine Reservation Application 314 | 100 | 5 |
| Machine Database 316 | 100 | 6 |
| Web Server 306 | 90 | 7 |
| Payroll Application 316 | 75 | 8 |
| Web Server 308 | 60 | 9 |

(51) Int. Cl.
  *G06F 11/34* (2006.01)
  *H04L 12/24* (2006.01)
(52) U.S. Cl.
  CPC ...... *H04L 41/0806* (2013.01); *H04L 41/0813* (2013.01)

(56) References Cited

U.S. PATENT DOCUMENTS

| | | | | |
|---|---|---|---|---|
| 2009/0183162 A1* | 7/2009 | Kindel | .................. | G06F 9/4843 718/103 |
| 2009/0313337 A1* | 12/2009 | Jin | ......................... | G06Q 10/10 709/206 |
| 2013/0111468 A1* | 5/2013 | Davis | ..................... | G06F 9/5077 718/1 |
| 2014/0165070 A1* | 6/2014 | Persikov | ............... | G06F 9/4881 718/103 |
| 2014/0330897 A1* | 11/2014 | Ma | ...................... | G06F 17/3089 709/203 |
| 2016/0117621 A1* | 4/2016 | Allam | ....................... | G06F 9/44 717/102 |
| 2016/0306689 A1* | 10/2016 | Jain | ..................... | G06F 11/0742 |

OTHER PUBLICATIONS

Wang, Juite et al., "A fuzzy multicriteria group decision making approach to select configuration items for software development", Fuzzy Sets and Systems, 134, pp. 343-363, 2003.

* cited by examiner

Service
302

| Schedule 402 | Cost 404 |
|---|---|
| Peak Business Hour (Mon-Fri 09:00 to 17:00) | 300 |
| Non-peak Business Hours (Mon-Fri 00:00 to 09:00 and 17:00 to 24:00) | 200 |
| Weekends (Sat-Sun) | 100 |

FIG. 4A

Machine Reservation Service
312

| Schedule 406 | Cost 408 |
|---|---|
| Weekdays (Mon-Fri) | 100 |
| Weekends (Sat-Sun) | 500 |

FIG. 4B

| Service | Cost (at Monday 3 PM) |
|---|---|
| Service 302 | 300 |
| Machine Reservation Service 312 | 100 |
| Payroll Service 324 | 75 |
| HR Service 318 | 125 |

FIG. 5A

| | Service 302 | Machine Reservation Service 312 | Payroll Service 324 | HR Service 318 | Score |
|---|---|---|---|---|---|
| Web Server 304 | 150 (300*.5) | 0 | 0 | 0 | 150 |
| Web Server 306 | 90 (300*.3) | 0 | 0 | 0 | 90 |
| Web Server 308 | 60 (300*.2) | 0 | 0 | 0 | 60 |
| Database 310 | 300 | 0 | 0 | 0 | 300 |
| Machine Reservation Application 314 | 0 | 100 | 0 | 0 | 100 |
| Machine Database 316 | 0 | 100 | 0 | 0 | 100 |
| Server 322 | 0 | 0 | 75 | 125 | 200 |
| Payroll Application 326 | 0 | 0 | 75 | 0 | 75 |
| HR Application 320 | 0 | 0 | 0 | 125 | 125 |

FIG. 5B

| Computer Module | Score | Rank |
|---|---|---|
| Database 310 | 300 | 1 |
| Server 322 | 200 | 2 |
| Web Server 304 | 150 | 3 |
| HR Application 320 | 125 | 4 |
| Machine Reservation Application 314 | 100 | 5 |
| Machine Database 316 | 100 | 6 |
| Web Server 306 | 90 | 7 |
| Payroll Application 316 | 75 | 8 |
| Web Server 308 | 60 | 9 |

FIG. 5C

DETERMINING STATUSES OF COMPUTER MODULES

CROSS-REFERENCE TO RELATED APPLICATIONS

This application is a continuation of, and claims priority to, U.S. patent application Ser. No. 14/750,549, filed on Jun. 25, 2015, originally entitled "RANKING COMPUTER MODULES," the disclosure of which is incorporated by reference herein in its entirety.

TECHNICAL FIELD

This description relates to computer systems.

BACKGROUND

Computer systems may utilize multiple software applications and/or services to facilitate operations of enterprises such as businesses. The services may not all be equally important to ensure that the operations run smoothly. Also, some of the services may rely on multiple computer modules, and some of the computer modules may be required to implement multiple services. Some computer modules may be required to implement multiple services, and if those computer modules fail, multiple important services could also fail.

SUMMARY

According to one general aspect, a non-transitory computer-readable storage medium may include instructions stored thereon for ranking multiple computer modules to reduce failure impacts. When executed by at least one processor, the instructions may be configured to cause a computing system implementing the multiple computer modules to at least associate the multiple computer modules with multiple services that rely on the multiple computer modules, at least one of the multiple services relying on more than one of the multiple computer modules, determine values of the multiple services, and rank the multiple computer modules based on the determined values of the multiple services with which the respective multiple computer modules are associated.

According to another general aspect, a computing system may include at least one processor, and a non-transitory computer-readable storage medium comprising instructions stored thereon for ranking multiple computer modules to reduce failure impacts. When executed by the at least one processor, the instructions may be configured to cause the computing system to at least associate multiple computer modules with multiple services that rely on the multiple computer modules, at least one of the multiple services relying on more than one of the multiple computer modules, determine values of the multiple services, and rank the multiple computer modules based on the determined values of the multiple services with which the respective multiple computer modules are associated.

According to another general aspect, a method for ranking multiple computer modules to reduce failure impacts may include provisioning multiple services that rely on the multiple computer modules, in conjunction with the provisioning the multiple services, associating the multiple computer modules with multiple services that rely on the multiple computer modules, at least one of the multiple services relying on more than one of the multiple computer modules, determining values of the multiple services, the values of each of the multiple services being based on a determined importance of the respective service, determining scores of the multiple computer modules based on the determined values of the multiple services that rely on the respective computer modules, ranking the multiple computer modules based on the determined scores of the multiple computer modules, re-determining the values of the multiple services based on a present time being included in a different part of a schedule for at least one of the multiple services than a previous time, re-ranking the multiple computer modules based on the re-determined values of the multiple services, selecting at least one of the multiple computer modules for failover support based on the rank of the at least one of the computer modules, and providing the failover support to the selected at least one computer module by associating a redundant computer module with a service associated with the selected at least one computer module.

The details of one or more implementations are set forth in the accompanying drawings and the description below. Other features will be apparent from the description and drawings, and from the claims.

BRIEF DESCRIPTION OF THE DRAWINGS

FIG. 4A is a table showing costs of a service at different times based on a schedule according to an example implementation.

FIG. 4B is a table showing costs of a machine reservation service at different times based on another schedule according to an example implementation.

FIG. 5A is a table showing costs of services at a specified time according to an example implementation.

FIG. 5B is a table showing scores of computer modules included in the service model shown in FIG. 3 according to an example implementation.

FIG. 5C is a table showing the computer modules ranked according to the scores shown in FIG. 5B according to an example implementation.

DETAILED DESCRIPTION

A computing system, such as a computer network including a datacenter, may include multiple computers that implement multiple computer modules to host, implement, and/or provide multiple services. The multiple computer modules, which may also be considered configuration items (CIs), may implement the multiple services. The computer modules may include virtual machines, hypervisors, web servers, software applications, and/or database servers. Some computer modules may implement a single service, some computer modules may implement multiple services, and some services may require multiple computer modules to implement the service.

The computing system may rank the computer modules based on scores associated with the computer modules. The scores may be based on determined importances (which may be represented by values) of services associated with and/or supported by the computer modules, and the impacts of computer modules failing on the services associated with the failing computer modules. The scores may be based on importances of services that require the respective computer modules for implementation. Individual computer modules that implement multiple services may have scores based on a sum of the importances of the multiple services that the respective computer modules implement. If multiple computer modules implement a single service, but the service could still function without one or more of the computer modules, then the scores of each of the multiple computer modules that implement the single service may be based on a fraction of the importance of the single service that the multiple computer modules implement. Based on the rankings, the computer modules may be prioritized and/or ranked (such as from most important to least important), for correction (such as by administrators), have their frequencies of monitoring determined and/or changed, be selected for decommissioning, be selected for provisioning a new service, and/or be selected for failover support, as non-limiting examples. The failover support for a computer module may include allocating one or more redundant computer modules to the service supported by the computer module so that if the computer module fails, the one or more redundant computer modules can still support the service. The rankings may be used to minimize the impact of disruptions or failure by the computer modules in a computer network with shared resources, the computer network being managed by the computing system described herein.

Figure 1:
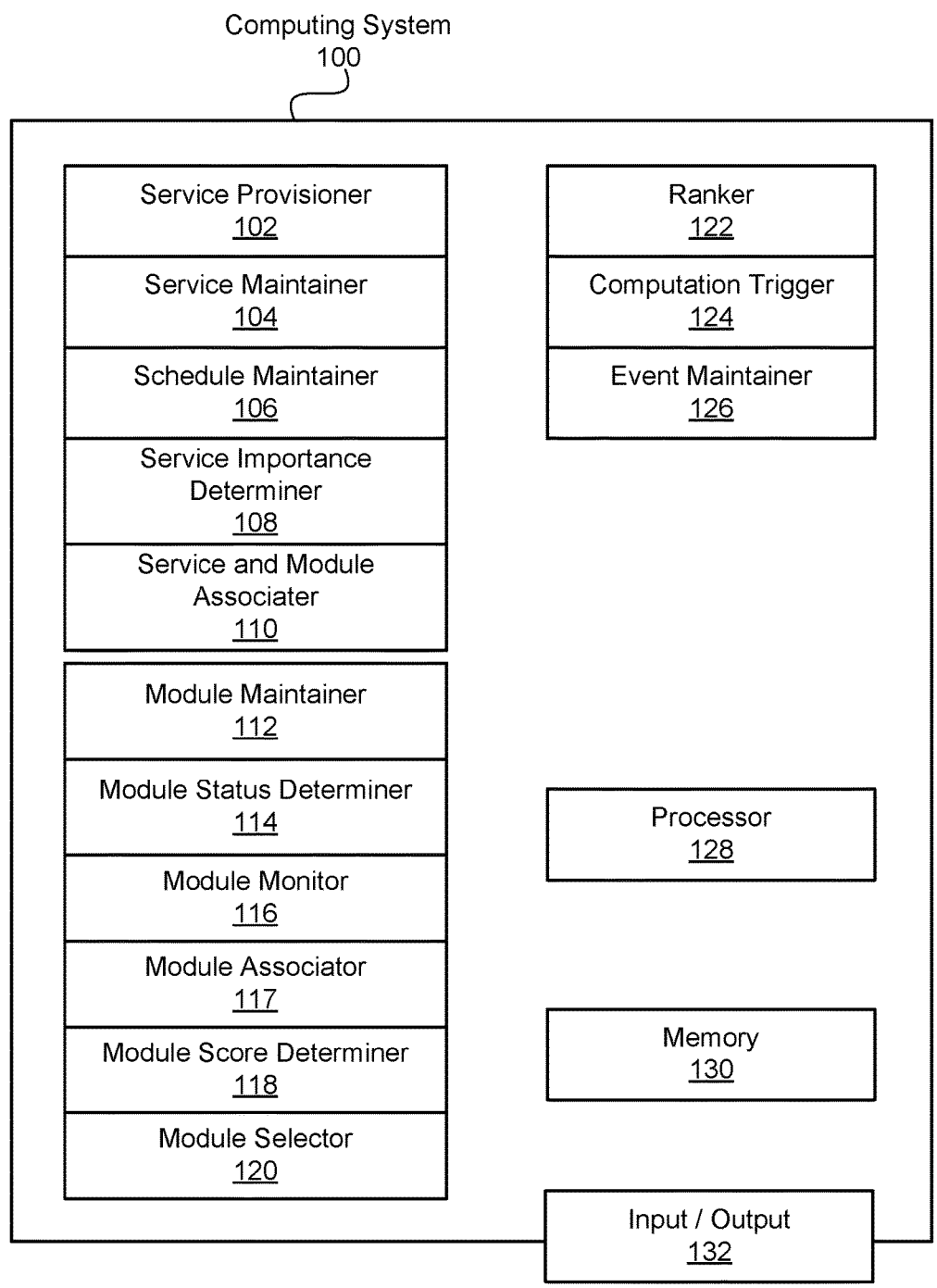
FIG. 1 is a block diagram of a computing system for ranking computer modules according to an example implementation.

FIG. 1 is a block diagram of a computing system 100 for ranking computer modules according to an example implementation. The computing system 100 may perform functions similar to those described above.

The computing system 100 may include a service provisioner 102. The service provisioner 102 may provision services by launching the services. The provisioning of the services may include allocating and/or assigning computer modules for the services. The service provisioner 102 may, for example, determine computing resources needed to implement the service, what computing resources are available and in which computing modules the computing resources are available, assign and/or allocate computer modules to the service based on the determinations of needed and available computing resources, and launch and/or implement the service using the allocated and/or assigned computer module(s). The services may include various computing applications, such as document creation, modification, and/or sharing, scheduling, financial determinations, web hosting, customer portals, virtual machine reservation services, payroll services, and/or human resource (HR) services as non-limiting examples. The service provisioner 102 may select computer modules with lowest ranks to minimize the impact of failure by a single computer module.

The computing system 100 may include a service maintainer 104. The service maintainer 104 may maintain the services that have been launched and/or provisioned by the service provisioner 102. The service maintainer 104 may, for example, ensure that adequate computing resources continue to be provided to each of the services, and determine whether any of the services are interrupted, such as if a service drops or fails.

The service maintainer 104 may also allocate failover resources to services and/or computer modules based on their ranks, such as by allocating failover resources to services with the highest ranks. The service maintainer 104 may allocate failover resources to services and/or computer modules by assigning more and/or redundant computer modules to the services so that, in the event that one or more of the computer modules assigned to the service fails, the service will also still continue to function by relying on the remaining computer modules. The service maintainer 106 may assign the failover resources to the highest ranked computer modules.

The service maintainer 104 may also determine that some of the services and/or computer modules should be decommissioned. The service maintainer 104 may determine that some of the services should be decommissioned based on their ranks, such as by decommissioning the service(s) and/or computer modules with the lowest rank(s). The service maintainer 104 may determine that one or more of the services and/or computer modules should be decommissioned based on insufficient computing resources, such as insufficient computer modules, to support all of the services. Based on a determination that the available computing resources are insufficient to support all the services, the service maintainer 104 may decommission services and/or computer modules, starting with the services and/or computer modules with lowest importance, thereby freeing the computer modules that supported and/or implemented the decommissioned services, until sufficient computing resources exist to support and/or implement all the services.

The computing system 100 may include a schedule maintainer 106. The schedule maintainer 106 may maintain a schedule for each of the services, and/or determine what part of a schedule a particular time falls into. Some services may be active during some dates and/or times and inactive during other dates and/or times, or may have greater importance or criticality at some dates and/or times than other dates and/or times. The schedule maintainer 106 may maintain these dates and/or times of activity or inactivity, or criticality. The schedule maintainer 106 may also maintain importances of each of the services for each part of the schedule. The services may have different importances at different parts of their respective schedules, reflecting their changing importances at different times, as shown and described below with respect to FIGS. 4A, 4B, 4C, and 4D. Not all services may be equally important, and the importances and/or costs of the services may be based on a cost of impact to business operations if the services become unavailable.

The computing system 100 may include a service importance determiner 108. The service importance determiner 108 may determine the importances, which may be relative importances, of the services launched by the service provisioner 102 and/or maintained by the service maintainer 104. The service importance determiner 108 may, for example, assign a numerical value or score to each of the services. The numerical value or score of each service may be based on the determined importance of each service. The importance may change based on the date and/or time, such as based on active or critical times maintained by the schedule maintainer 106. The service importance determiner 108 may determine the importances based on input received by the computing system 100 from an administrator, or based on importances included in a file or template, as non-limiting examples.

The computing system 100 may include a service and module associater 110. The service and module associater 110 may associate services with the computer modules needed to implement the services. The service and module associater 110 may, for example, associate services with the computer modules that the service provisioner 102 determined were needed to implement the services, and may associate the services with the computer modules in response to the service provisioner 102 provisioning the services. At least one of the services may rely on more than one of the multiple computer modules.

The computing system 100 may include a module maintainer 112. The module maintainer 112 may maintain the computer modules (which may also be considered configuration items), such as by ensuring that they are continuing to run properly and have not been overloaded with requests from more services than the computer modules have resources to handle. The module maintainer 112 may also decommission, end, and/or turn off a computer module.

The computing system 100 may include a module status determiner 114. The module status determiner 114 may determine the status of the computer modules maintained by the computing system 100. The module status determiner 114 may determine, for example, whether a computer module is functioning properly, has resource requests that exceed the capacity of the computer module, a proportion (such as a percentage) of the resources of the computer module that are currently being used and/or whether the proportion of the resources of the computer module that are currently being used exceeds a threshold that indicates a risk of exceeding the resources of the computer module, and/or whether the computer module has failed or is not providing all of the needed resources to services depending on the computer module.

The computing system 100 may include a module monitor 116. The module monitor 116 may monitor (such as in conjunction with the module status determiner 114), and/or determine a frequency of monitoring, the computer modules. The module monitor 116 may determine the frequency of monitoring the computer modules based, for example, on the importance and/or rank of the computer modules. The module monitor 116 may, for example, increase a frequency of monitoring a computer module based on the rank of the computer module, and/or decrease a frequency of monitoring a computer module based on the rank of the computer module. The module monitor 116 may determine to monitor more important and/or more highly ranked computer modules more frequently and less important and/or lower ranked computer modules less frequently, and/or select computer modules for which to increase and/or decrease frequency of monitoring based on the rank of the computer modules, according to an example embodiment.

The computing system 100 may include a module associater 117. The module associater 117 may associate the computer modules with the services. The module associater 117 may interface and/or communicate with the service and module associater 110 to determine the services with which each computer module is associated and/or supports.

The computing system 100 may include a module score determiner 118. The module score determiner 118 may determine scores for each computer module. The module score determiner 118 may determine the scores for each computer module based on the importance(s) of the services that are associated with and/or dependent on the respective computer module. The module score determiner 118 may, for example, add (and/or determine a sum of) the numerical importances of each of the services associated with the respective computer module. If a service is associated with more than one computer module, and the service could function without one of the computer modules, the module score determiner 118 may divide the numerical importance of the service by the number of computer modules associated with the service (and/or multiply, for each of the computer modules associated with the service, the importance by a fraction less than one, with the fractions for all of the computer modules associated with the service adding up to one) and add the quotient (and/or product) to the score of each computer module. If each of the computer modules is necessary for the service to function, the module score determiner 118 may add the numerical importance of the service to each of the computer modules associated with the service. The module score determiner 118 may either divide the numerical importance by the number of computer modules (or multiply the numerical importance by a fraction which may be the same or different for each of the computer modules), or add the numerical importance to each of the computer modules, based on whether each of the computer modules is necessary for the performance of the service and/or whether a given computer module could be replaced with another computer module while the service is still provided and/or performed.

The computing system 100 may include a module selector 120. The module selector may select computer modules for provisioning and/or supporting services. If new computer modules are not available, the module selector 120 may select a lower-ranked computer module to provision the new service, so that a less important service dependent on the lower-ranked computer module may be decommissioned rather than a more important service dependent on a higher-ranked computer module. The module selector 120 may select computer modules to support the services based on the resource needs of the services and/or based on the resources available at each of the computer modules. The module selector 120 may also select for decommissioning, and/or decommission, a computer module based on a low rank of the computer module when at least one of the computer modules needs to be decommissioned, such as when the computing system 100 does not have sufficient computing resources to support all the computer modules. The module selector 120 may also, if the service maintainer 104 has selected service(s) for decommissioning, select the computer modules associated with the service(s) for decommissioning and/or disassociation with the service(s).

The computing system 100 may include a ranker 122. The ranker 122 may rank the computer modules based on determined importances of the multiple services, and/or based on the scores of the computer modules that the module score determiner 118 determined. The ranker 122 may, for example, rank the computer modules in descending order with the computer modules that have the highest scores as the highest ranked, or rank the computer modules in ascending order with the computer modules that have the lowest scores as the highest ranked.

The computer system 100 may include a computation trigger 124. The computation trigger 124 may prompt the module score determiner 118 to re-determine and/or re-compute the scores of the computer modules, and/or prompt the service importance determiner 108 to re-determine the importances and/or values of the services, and/or prompt the ranker 122 to re-rank the computer modules. The re-computation, re-determining, and/or re-ranking may update the scores, values, and/or ranks in response to events and enable the computer system to minimize the impacts of failures by providing support to the most important computer modules and/or distributing resources in such a manner as to reduce the impact of any one computer module failing. The computation trigger 124 may prompt the module score determiner 118 to re-determine and/or re-compute the scores of the computer modules, and/or prompt the service importance determiner 108 to re-determine the importances of the events, and/or prompt the ranker 122 to re-rank the computer modules, in response to events such as the present time being within a different part of and/or within a different period of, a schedule for at least one of the services than a previous time, preconfigured and/or predetermined events occurring in a computer network monitored by the computing system 100, a preconfigured event associated with at least one of the computer modules exceeding a time threshold, a new computer module being added to the computer network that the computing system 100 is monitoring, or a computer module ceasing to function properly, as non-limiting examples.

The computing system 100 may include at least one processor 128. The at least one processor 128 may include a processor, such as a microprocessor, capable of executing stored instructions to execute any of the functions, methods, or processes described herein.

The computing system 100 may include at least one memory device 130. The at least one memory device 130 may store data and/or instructions. The data may include data and/or information used to perform, and/or generated as a result of, any of the functions, methods, or processes described herein. The instructions may include instructions for the at least one processor 128 to execute any of the functions, methods, or processes described herein.

The computing system 100 may include at least one input/output device 132. The input/output device 132 may include one or more input devices which receive data from other computing systems and/or receive user input, and one or more output devices which send data to other computing systems and/or provide output to one or more users. The at least one processor 128, at least one memory 130, and at least one input/output device 132 may be included in a single computing device, or may be distributed among multiple computing devices in a distributed system.

Figure 2:
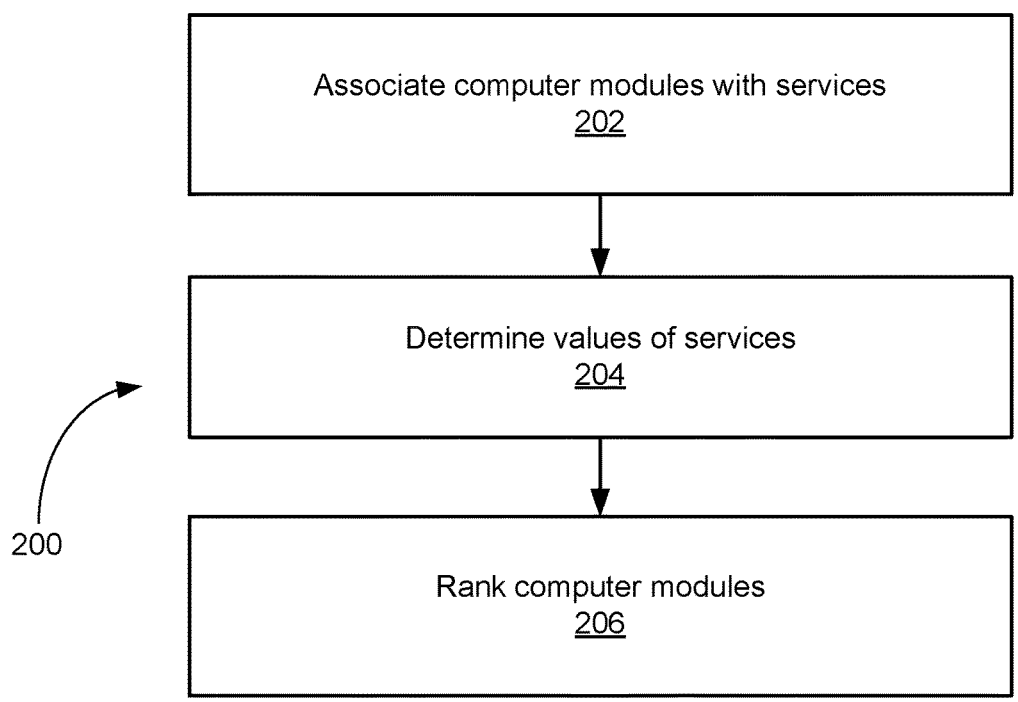
FIG. 2 is a flowchart of a method for ranking computer modules according to an example implementation.

FIG. 2 is a flowchart of a method 200 for ranking computer modules to reduce failure impacts according to an example implementation. According to this example, the method 200 may include associating the multiple computer modules with multiple services that rely on the multiple computer modules, at least one of the multiple services relying on more than one of the multiple computer modules (202). The method 200 may also include determining values of the multiple services (204). The method 200 may also include ranking the multiple computer modules based on the determined values of the multiple services with which the respective multiple computer modules are associated (206).

According to an example implementation, the associating the multiple computer modules with the multiple services that rely on the multiple computer modules is performed in conjunction with provisioning the multiple services.

According to an example implementation, the determined value of each of the multiple services is based on a determined importance of the respective service.

According to an example implementation, the ranking the multiple computer modules includes ranking each of the multiple computer modules based on the determined values of the multiple services that rely on the respective computer modules.

According to an example implementation, the method 200 may further include determining scores of the multiple computer modules based on the values of the multiple services with which the multiple computer modules are associated. In this example the ranking the multiple computer modules may include ranking the multiple computer modules based on the determined scores of the multiple computer modules.

According to an example implementation, the method 200 may further include re-determining the values of the multiple services based on a present time being part of a different part of a schedule for at least one of the multiple services than a previous time, and re-ranking the multiple computer modules based on the re-determined values of the multiple services.

According to an example implementation, the method 200 may further include re-determining the values of the multiple services based on a preconfigured event occurring in a computer network managed by the computing system, and re-ranking the multiple computer modules based on the re-determined values of the multiple services.

According to an example implementation, the method 200 may further include re-determining the values of the multiple services based on a preconfigured event associated with at least one of the computer modules exceeding a time threshold, and re-ranking the multiple computer modules based on the re-determined values of the multiple services.

According to an example implementation, the method 200 may further include re-determining the values of the multiple services based on a new computer module being added to a computer network managed by the computing system, and re-ranking the multiple computer modules based on the re-determined values of the multiple services.

According to an example implementation, the method 200 may further include re-determining the values of the multiple services based on at least one of the multiple computer modules ceasing to function properly, and re-ranking the multiple computing modules based on the re-determined values of the multiple services.

According to an example implementation, the method 200 may further include increasing a frequency of monitoring at least one of the multiple computer modules based on the rank of the at least one computer module.

According to an example implementation, the method 200 may further include decreasing a frequency of monitoring at least one of the multiple computer modules based on the rank of the at least one computer module.

According to an example implementation, the method 200 may further include selecting at least one computer module for which to decrease a frequency of monitoring based on the rank of the at least one computer module.

According to an example implementation, the method 200 may further include decommissioning at least one of the computer modules based on the rank of the at least one of the computer modules.

According to an example implementation, the method 200 may further include determining that available computing resources are insufficient to support all of the multiple services. In this example the decommissioning is performed in response to the determining that available computing resources are insufficient to support all of the multiple services.

According to an example implementation, the method 200 may further include selecting at least one of the computer modules for provisioning a new service based on the rank of the at least one of the computer modules.

According to an example implementation, the method 200 may further include selecting at least one of the computer modules for failover support based on the rank of the at least one of the computer modules.

According to an example implementation, the method 200 may further include providing the failover support to the selected at least one computer module by associating a redundant computer module with a service associated with the selected at least one computer module.

Figure 3:
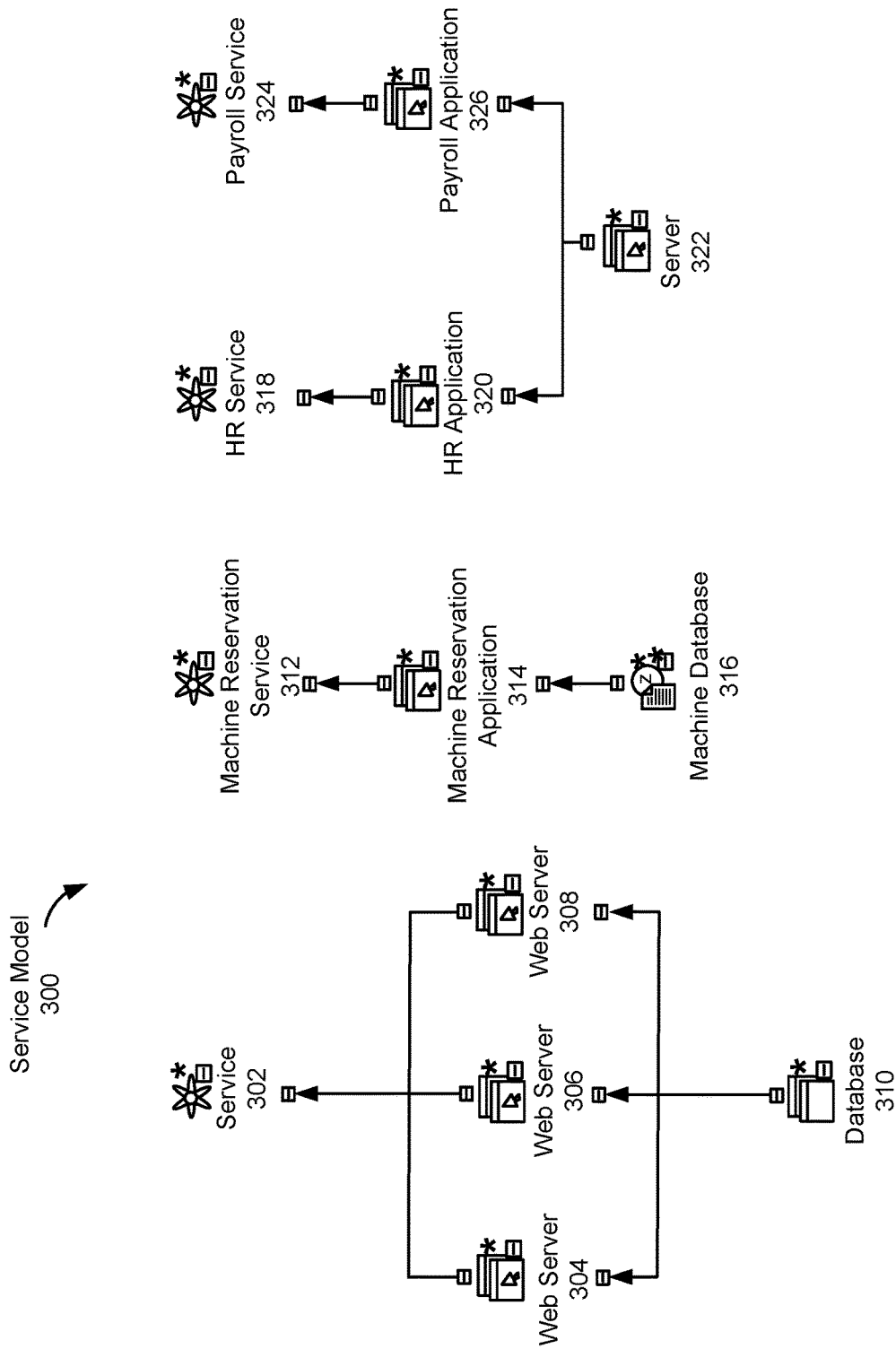
FIG. 3 is a diagram of a service model used in ranking computer modules according to an example implementation.

FIG. 3 is a diagram of a service model 300 used in ranking computer modules according to an example implementation. In this example, the service model 300 may include and/or implement a service 302, a machine reservation service 312, a human resources (HR) service 318, and a payroll service 324. While four services 302, 312, 318, 324 are implemented in the service model 300 shown in FIG. 3, more or fewer services may be implemented by other example service models.

In the example shown in FIG. 3, the service 302 may include a web application platform. In this example, four computer modules may implement and/or support the web application platform and/or service 302. The four computer modules may include three web servers 304, 306, 308, and a database 310. The three web servers 304, 306, 308 may share the load caused by Internet traffic to and from the web application platform, and when Internet traffic is low, the web application platform may not require all three web servers 304, 306, 308 at once. The web servers 304, 306, 308 may be part of a cluster, and each of the web servers 304, 306, 308 in the cluster may be assigned a relative weight within the cluster, which may be based on whether they are a primary web server or a backup web server. In an example embodiment, the module score determiner 118 may assign a primary web server 304 a weight of fifty percent (50%) of the importance of the service 302, the module score determiner 118 may assign a secondary web server 306 a weight of thirty percent (30%) of the importance of the service 302, and the module score determiner 118 may assign a third web server 308 a weight of twenty percent (20%) of the importance of the service 302. The service 302 may require the database 310 to implement the web application platform, causing the module score determiner 118 to assign the database 310 a score equal to the full importance of the service 302. The three web servers 304, 306, 308 and the database 310 may be dedicated solely to the service 302.

The service model 300 may also include and/or implement the machine reservation service 312. The machine reservation service 312 may require two computer modules, a machine reservation application 314 and a machine database 316. Both the machine reservation application 314 and the machine database 316 may be required to implement the machine reservation service 312, and both the machine reservation application 314 and the machine database 316 may be dedicated solely to the machine reservation service 312, causing the module score determiner 118 to assign the machine reservation application 314 and the machine database 316 each a score equal to the importance of the machine reservation service 312.

The service model 300 may also include and/or implement the HR service 318. The HR service 318 may require, as computer modules, an HR application 320 and a server 322. The HR application 320 may be dedicated solely to the HR service 318, causing the module score determiner 118 to assign the HR application a score equal to the importance of the HR service 318, but the server 322 may be shared between the HR service 318 and the payroll service 324, causing the module score determiner 118 to assign the server 322 a score based on a sum of the importances of the HR service 318 and the payroll service 324.

The service model 300 may also include and/or implement the payroll service 324. The payroll service 324 may require, as computer modules, a payroll application 326 and the server 322. The payroll application 326 may be dedicated solely to the payroll service 324, but the server 322 may be shared between the payroll service 324 and the HR service 318, causing the module score determiner 118 to assign the payroll application 326 a score equal to the full importance of the payroll service 324, and to add the importance of the payroll service 324 to the score of the server 322 based on the server's 322 support of the HR service 318.

FIGS. 4A, 4B, 4C, and 4D show costs 404, 408, 412, 416 associated with services 302, 312, 324, 318. The costs 404, 408, 412, 416 may be interchanged with, and/or be considered equivalent or synonymous with, importances, of services, as described herein.

FIG. 4A is a table showing costs 404 of the service 302 at different times based on a schedule 402 according to an example implementation. The cost 404 of the service 302 may change based on a time period within the schedule 402. In this example, during peak business hours (which may be between 9 am/09:00 and 5 pm/17:00) during the week (Monday through Friday), the service 302 has a cost 404 of 300. During non-peak business hours (which may be between 5 pm/17:00 and 9 am/09:00) during the week (Monday through Friday), the service 302 has a cost 404 of 200. During the weekends (Saturday and Sunday), the service 302 has a cost 404 of 100. These costs 404 reflect the relative importance of providing the service 302 at different times, with greatest importance during peak business hours, next non-peak business hours, and least importance on weekends.

FIG. 4B is a table showing costs 408 of the machine reservation service 312 at different times based on a schedule 406 according to an example implementation. In this example, weekends may be more important for the machine reservation service 312 than weekdays. Based on the greater importance during weekends than during the week, the cost 408 of the machine reservation service 312 may change based on the time period within the schedule 406. The machine reservation service 312 may have a cost 408 of 100 during weekdays (which may be Monday through Friday), and the machine reservation service 312 may have a cost 408 of 500 during weekends (which may be Saturday and Sunday).

Figure 4C:
FIG. 4C is a table showing a cost of a payroll service according to an example implementation.

FIG. 4C is a table showing a cost 412 of a payroll service 324 according to an example implementation. In this example, the cost 412 does not vary based on the time period within the schedule 410, and/or is the same at all days (Monday through Sunday) and times, and is always 75.

Figure 4D:
FIG. 4D is a table showing a cost of a human resource (HR) service according to an example implementation.

FIG. 4D is a table showing a cost 416 of the HR service 318 according to an example implementation. In this example, the cost 416 does not vary based on the time period within the schedule 414 and/or is the same at all days (Monday through Sunday) and times, and is always 125.

FIG. 5A is a table showing costs, and/or importances, of the services 302, 312, 324, 318 at a specified time according to an example implementation. In this example, the time may be Monday at 3 pm. This may place the service 302 in the peak business hours for a score of 300, place the machine reservation service 312 during a weekday for a score of 100, and the payroll service 324 and HR service 318 would be assigned their only allowable scores of 75 and 125, respectively.

FIG. 5B is a table showing scores of computer modules included in the service model shown in FIG. 3 according to an example implementation. As shown in FIG. 5B, the web server 304, which has a weight of fifty percent (50%) of the importance of the service 302 (which is 300 as described above), has a score of 300*0.5=150. The web server 306, which has a weight of thirty percent (30%) of the importance of the service 302, has a score of 300*0.3=90. The web server 308, which has a weight of twenty percent (20%) of the importance of the service 302, has a score of 300*0.2=60. The database 310, which is required to implement the service 302, has a score of 300, equal to the importance of the service 302.

The machine reservation application 314 and the machine database 316 are both required to implement the machine reservation service 312, and therefore have scores of 100, equal to the importance of the machine reservation service 312.

The server 322 is required to implement both the HR service 318 and the payroll service 324. Because the server 322 is required to implement both the HR service 318 and the payroll service 324, the server 322 has a score of 200, equal to the sum of the importance of the HR service 318 (125) and the importance of the payroll service 324 (75).

The payroll application 326, which is required to implement the payroll service 324, has a score of 75, equal to the importance of the payroll service 324.

The HR application 320, which is required to implement the HR service 318, has a score of 125, equal to the importance of the HR service 318.

FIG. 5C is a table showing the computer modules ranked according to the scores shown in FIG. 5B according to an example implementation. As shown in FIG. 5C, the database 310, with the highest score of 300, has the highest rank of one (1); the server 322, with a score of 200, has the rank of two (2); the web server 304, with a score of 150, has a rank of three (3); the HR application 320, which has a score of 125, has a rank of four (4); the machine reservation application 314 and machine database 316, which have scores of 100, can either be tied with ranks of five (5) or have ranks of five (5) and six (6) as shown in FIG. 5C; the web server 306, which has a score of 90, has a rank of seven (7); the payroll application 326, which has a score of 75, has a rank of eight (8); and the web server 308, which has a score of 60, has the lowest rank, nine (9). The computing system 100 may recompute the score and re-rank the computer modules when a service enters a different part of the service's respective schedule, when changes are introduced to the system such as computing devices such as servers are added or removed, or when a computer module goes down and/or fails. For example, if the web server 306, which is part of a cluster with the web servers 304, 306, went down, then the remaining web servers 304, 306 in the cluster would be assigned higher scores by redistributing the score from the web server 306 to the web servers 304, 306, which may result in the web servers 304, 306 having higher ranks.

The ranks of the computer modules may be used to prioritize ticket requests, such as to request support personnel and/or information technology specialists to repair or patch any issues with the computer modules (the support personnel and/or information technology specialists may be requested to repair or patch more highly ranked computer modules first), to decommission computer modules with lower ranks in the event that insufficient resources exist to support all the computer modules, and/or for the module monitor 116 to change a frequency of monitoring the computer modules, such as the module monitor 116 monitoring computer modules with higher ranks more frequently and monitoring computer modules with lower ranks less frequently.

In an example implementation, the computing system 100 may perform adaptive monitoring to dynamically rank the computer modules. The module monitor 116 may dynamically adjust a frequency of monitoring the computer modules. For example, when a service transitions from one part of a schedule to another, such as from peak business hours to non-peak business hours, or from a weekday to a weekend, the cost or importance of the service may change. The module monitor 116 may change the frequency of monitoring the service in proportion to the change or cost or importance. In one example, if the earlier cost or importance was $C_a$, the frequency of monitoring was $F_a$, and the new cost or importance is $C_b$, then the new frequency $F_b$ of monitoring could be adjusted to $C_a C_b * F_a$. If $C_a=100$, $F_a=1$ minute (poll every minute), and $C_b=200$, then $F_b=100/200*1=0.5$ minutes (poll every half minute or twice each minute).

In another example, when the monitoring agent such as the module monitor 116 itself is under an excessive load, a throttling mechanism may lower the frequency of monitoring. The monitoring agent may be under load in situations such as when the monitoring agent goes down within a cluster or network congestion is such that it is desirable to limit the transfer of monitoring data (data generated and sent by the monitoring agent), the throttling mechanism may lower the frequency of monitoring to slow down the data collection and processing performed by the monitoring agent until the monitoring agent is no longer under the excessive load. The module monitor 116 could lower the frequency of monitoring all the computer modules, or only the lowest ranked computer module(s).

In another example, priorities and/or rankings of services and/or computer modules may be updated in response to preconfigured events such as use of computing resources, such as processing resources, memory resources, and/or network or communication resources. For example, processor usage above a certain threshold such as 60% for a predetermined time such as two minutes may be considered a medium priority event, and processor usage above another threshold such as 80% for a predetermined time such as two minutes may be considered a critical priority event. The priority and/or ranking of computer modules may be changed, such as increasing the rankings of computer modules, in response to the computing resource usage associated with the computer modules exceeding predetermined thresholds for predetermined times. The increased ranks of the computer modules may prompt support personnel to address any issues regarding computer resource usage with respect to the computer modules.

In another example, failover may be provided for some computer modules to ensure high availability. The computing system 100 may maintain a pool of failover resources, which may include computing resources dedicated to failover events, to accommodate a small percentage of the computer modules. The computing system 100 may assign the failover resources to the computer modules with the highest ranks in response to the computer modules being re-ranked. The computing system 100 may also decommission some predetermined percentage of the lowest ranked computer modules, and/or provision some other predetermined percentage of the highest ranked computer modules, in response to the computer modules being re-ranked.

In another example embodiment, when the service provisioner 102 provisions a new service, the service provisioner 102 may assign computer modules to the new service that have low or lowest scores. Assigning computer modules with lower scores and/or ranks to new services may prevent a single or multiple computer modules from becoming too critical or a single point of failure for multiple services.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon for determining statuses of computer modules to reduce failure impacts, that, when executed by at least one processor, are configured to cause a computing system implementing the computer modules to at least:

determine an association of at least two computer modules with at least one service that requires the at least two computer modules to implement the at least one service;

determine at least one value of the at least one service;

determine scores of the at least two computer modules based on the at least one value of the at least one service with which the at least two computer modules are associated;

rank the at least two computer modules based on the determined scores of the at least two computer modules;

re-determine a value of the at least one service based on a computational trigger, the computational trigger including at least one of:

a present time being in a different part of a schedule than a previous time, the schedule being associated with the at least one service;

at least one event occurring in a computing network monitored by the computing system;

an event associated with at least one of the at least two computing modules exceeding a time threshold;

a new computer module being added to the computing network that the computing system is monitoring; or a computer module ceasing to function properly;

re-determine the scores of the at least two computer modules based on the re-determined value of the at least one service;

re-rank the at least two computer modules based on the re-determined scores of the at least two computer modules;

increase a frequency of determining a status of a first of the at least two computer modules based on the re-ranking, causing the first of the at least two computer modules to have a higher rank than before the re-ranking;

decrease a frequency of determining a status of a second of the at least two computer modules based on the re-ranking, causing the second of the at least two computer modules to have a lower rank than before the re-ranking; and in response to the computing system having insufficient resources to support the at least two computer modules, decommission one of the at least two computer modules based on the one of the at least two computer modules having a low rank based on the re-ranking of the at least two computer modules.

2. The non-transitory computer-readable storage medium of claim 1, wherein the determining the association of the at least two computer modules with the at least one service is performed in conjunction with provisioning the at least one service.

3. The non-transitory computer-readable storage medium of claim 1, wherein the determined value of the at least one service is based on a determined importance of the at least one service.

4. The non-transitory computer-readable storage medium of claim 1, wherein the ranking the at least two computer modules includes ranking each of the at least two computer modules based on the determined value of the at least one service.

5. The non-transitory computer-readable storage medium of claim 1, wherein the instructions are further configured to cause the computing system to select the second of the at least two computer modules for which to decrease the frequency of determining the status based on the lower rank of the second of the at least two computer modules.

6. The non-transitory computer-readable storage medium of claim 1, wherein the determining the status of the first of the at least two computer modules comprises determining whether the first of the at least two computer modules has failed.

7. The non-transitory computer-readable storage medium of claim 1, wherein the determining the status of the first of the at least two computer modules comprises determining whether a proportion of resources that the first of the at least two computer modules is using exceeds a threshold that indicates a risk of exceeding the resources of the first of the at least two computer modules.

8. The non-transitory computer-readable storage medium of claim 1, wherein the computational trigger comprises the present time being in the different part of the schedule than the previous time, the schedule being associated with the at least one service.

9. The non-transitory computer-readable storage medium of claim 1, wherein the computational trigger comprises the at least one event occurring in the computing network monitored by the computing system.

10. The non-transitory computer-readable storage medium of claim 1, wherein the computational trigger comprises the event associated with at least one of the at least two computing modules exceeding the time threshold.

11. The non-transitory computer-readable storage medium of claim 1, wherein the computational trigger comprises the new computer module being added to the computing network that the computing system is monitoring.

12. The non-transitory computer-readable storage medium of claim 1, wherein the computational trigger comprises the computer module ceasing to function properly.

13. A computing system comprising:
at least one processor; and
a non-transitory computer-readable storage medium comprising instructions stored thereon for determining statuses of computer modules to reduce failure impacts, that, when executed by the at least one processor, are configured to cause the computing system to at least:
determine an association of at least two computer modules with at least one service that requires the at least two computer modules to implement the at least one service;
determine a value of the at least one service;
determine scores of the at least two computer modules based on the value of the at least one service with which the at least two computer modules are associated;
rank the multiple computer modules based on the determined scores of the at least two computer modules;
re-determine a value of the at least one service based on a computational trigger, the computational trigger including at least one of:
a present time being in a different part of a schedule than a previous time, the schedule being associated with the at least one service;
at least one event occurring in a computing network monitored by the computing system;
an event associated with at least one of the at least two computing modules exceeding a time threshold;
a new computer module being added to the computing network that the computing system is monitoring; or
a computer module ceasing to function properly;
re-determine the scores of the at least two computer modules based on the re-determined value of the at least one service;
re-rank the at least two computer modules based on the re-determined scores of the at least two computer modules;
increase a frequency of determining a status of a first of the at least two computer modules based on the re-ranking causing the first of the at least two computer modules to have a higher rank than before the re-ranking;
decrease a frequency of determining a status of a second of the at least two computer modules based on the re-ranking causing the second of the at least two computer modules to have a lower rank than before the re-ranking; and
decommission one of the at least two computer modules based on the one of the at least two computer modules having a low rank based on the re-ranking of the at least two computer modules.

14. The computing system of claim 13, wherein the instructions are further configured to cause the computing system to select at least one of the at least two computer modules for provisioning a new service based on the re-ranking of the at least one of the computer modules.

15. The computing system of claim 13, wherein the instructions are further configured to cause the computing system to select at least one of the at least two computer modules for failover support based on the re-ranking of the at least one of the at least two computer modules.

16. The computing system of claim 15, wherein the instructions are further configured to cause the computing system to provide the failover support to the selected at least one of the at least two computer modules by associating a redundant computer module with a service associated with the selected at least one of the at least two computer modules.

17. The computing system of claim 13, wherein the computational trigger comprises the present time being in the different part of the schedule than the previous time, the schedule being associated with the at least one service.

18. The computing system of claim 13, wherein the computational trigger comprises the at least one occurring in the computing network monitored by the computing system.

19. The computing system of claim 13, wherein the computational trigger comprises the event associated with at least one of the at least two computing modules exceeding the time threshold.

20. The computing system of claim 13, wherein the computational trigger comprises the new computer module being added to the computing network that the computing system is monitoring.

21. The computing system of claim 13, wherein the computational trigger comprises the computer module ceasing to function properly.

22. A method for determining statuses of computer modules to reduce failure impacts, the method comprising:
provisioning at least one service that requires at least two computer modules to implement the at least one service;
in conjunction with the provisioning the at least one service, determining an association of the at least two computer modules with the at least one service;
determining a value of the at least one service, the value of the at least one service being based on a determined importance of the at least one service;
determining scores of the at least two computer modules based on the determined value of the at least one service with which the at least two computer modules are associated;
ranking the at least two computer modules based on the determined scores of the at least two computer modules;
re-determining the value of the at least one service based on a computational trigger, the computational trigger including at least one of:
a present time being in a different part of a schedule for the at least one service than a previous time;
at least one event occurring in a computing network monitored by a computing system implementing the computer modules;
an event associated with at least one of the at least two computing modules exceeding a time threshold;
a new computer module being added to the computing network that the computing system is monitoring; or
a computer module ceasing to function properly;
re-determining the scores of the at least two computer modules based on the re-determined value of the at least one service;
re-ranking the multiple computer modules based on the re-determined scores of the multiple computer modules;
selecting at least one of the at least two computer modules for failover support based on the rank of the at least one of the at least two computer modules;
providing the failover support to the selected at least one of the at least two computer modules by associating a redundant computer module with a service associated with the selected at least one of the at least two computer modules;
increasing a frequency of determining a status of a first of the at least two computer modules based on the re-ranking causing the first of the at least two computer modules to have a higher rank than before the re-ranking; and
decreasing a frequency of determining a status of a second of the at least two computer modules based on the re-ranking causing the second of the at least two computer modules to have a lower rank than before the re-ranking.

23. The method of claim 22, wherein the computational trigger comprises the present time being in the different part of the schedule than the previous time, the schedule being associated with the at least one service.

24. The method of claim 22, wherein the computational trigger comprises the at least one occurring in the computing network monitored by the computing system.

25. The method of claim 22, wherein the computational trigger comprises the event associated with at least one of the at least two computing modules exceeding the time threshold.

26. The method of claim 22, wherein the computational trigger comprises the new computer module being added to the computing network that the computing system is monitoring.

27. The method of claim 22, wherein the computational trigger comprises the computer module ceasing to function properly.

* * * * *